United States Patent
Fukawatase et al.

(10) Patent No.: US 9,180,835 B2
(45) Date of Patent: Nov. 10, 2015

(54) KNEE AIRBAG DEVICE FOR AN AUTOMOBILE

(75) Inventors: Osamu Fukawatase, Miyoshi (JP); Makoto Ozeki, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/350,662

(22) PCT Filed: Oct. 11, 2011

(86) PCT No.: PCT/JP2011/073343
§ 371 (c)(1),
(2), (4) Date: Apr. 9, 2014

(87) PCT Pub. No.: WO2013/054397
PCT Pub. Date: Apr. 18, 2013

(65) Prior Publication Data
US 2014/0291972 A1 Oct. 2, 2014

(51) Int. Cl.
*B60R 21/231* (2011.01)
*B60R 21/206* (2011.01)
*B60R 21/2338* (2011.01)
*B60R 21/00* (2006.01)

(52) U.S. Cl.
CPC ............ *B60R 21/231* (2013.01); *B60R 21/206* (2013.01); *B60R 21/2338* (2013.01); *B60R 2021/0004* (2013.01); *B60R 2021/0051* (2013.01); *B60R 2021/23169* (2013.01)

(58) Field of Classification Search
CPC ............ B60R 21/233; B60R 21/2338; B60R 2021/23169; B60R 2021/23324; B60R 2021/23382
USPC ................ 280/743.2, 740, 742, 743.1, 730.1
See application file for complete search history.

(56) References Cited

U.S. PATENT DOCUMENTS

| | | | | |
|---|---|---|---|---|
| 6,685,217 B2* | 2/2004 | Abe | ........................ | 280/730.1 |
| 6,752,417 B2* | 6/2004 | Takimoto et al. | .......... | 280/730.1 |
| 7,147,247 B2* | 12/2006 | Hayakawa | ..................... | 280/740 |
| 7,213,834 B2* | 5/2007 | Mizuno et al. | ............. | 280/730.1 |
| 7,604,250 B2* | 10/2009 | Hotta et al. | ................ | 280/728.2 |
| 7,669,895 B2* | 3/2010 | Abe et al. | ................... | 280/743.2 |
| 7,891,700 B2* | 2/2011 | Ishida | ........................ | 280/730.1 |
| 8,029,016 B2* | 10/2011 | Moritani | .................... | 280/730.1 |

(Continued)

FOREIGN PATENT DOCUMENTS

| | | |
|---|---|---|
| CN | 101024389 A | 8/2007 |
| EP | 1826073 A1 | 8/2007 |

(Continued)

*Primary Examiner* — Drew Brown
(74) *Attorney, Agent, or Firm* — Kenyon & Kenyon LLP

(57) ABSTRACT

Axial forces on the shins of small-bodied occupants and medium-bodied occupants may be suppressed or prevented, and protective performance of the knee areas of large-bodied occupants is assured. A vehicle knee airbag device is equipped with a knee airbag main body portion that is formed in a thin bag shape and that inflates and expands from below to above along a design surface of an instrument panel floor when gas is supplied thereto. A protection portion of the knee airbag main body portion has a size capable of covering both knees of an occupant, from small-bodied occupants to large-bodied occupants. A U-shaped lower tether is disposed in an upper portion of the interior of the protection portion; vertical direction dividing portions of the lower tether extend to the upward side from portions that correspond with both knees of medium-bodied occupants.

5 Claims, 5 Drawing Sheets

(56) References Cited

U.S. PATENT DOCUMENTS

| | | | |
|---|---|---|---|
| 8,186,707 B2 * | 5/2012 | Matsushima et al. | 280/730.1 |
| 8,272,667 B2 * | 9/2012 | Schneider et al. | 280/730.1 |
| 8,292,323 B2 * | 10/2012 | Matsushima et al. | 280/730.1 |
| 2005/0057028 A1 | 3/2005 | Hayakawa | |
| 2005/0062265 A1 | 3/2005 | Hotta et al. | |
| 2005/0151351 A1 * | 7/2005 | Enders et al. | 280/730.1 |
| 2007/0200321 A1 | 8/2007 | Heitplatz et al. | |
| 2008/0122205 A1 | 5/2008 | Imamura et al. | |
| 2009/0230661 A1 * | 9/2009 | Fukawatase et al. | 280/730.1 |
| 2010/0295279 A1 * | 11/2010 | Fukawatase et al. | 280/730.1 |
| 2014/0125039 A1 * | 5/2014 | Abele et al. | 280/730.1 |

FOREIGN PATENT DOCUMENTS

| | | |
|---|---|---|
| EP | 2316696 A1 | 5/2011 |
| JP | 2003-175793 A | 6/2003 |
| JP | 2004-122922 A | 4/2004 |
| JP | 2005-096576 A | 4/2005 |
| JP | 2005-096625 A | 4/2005 |
| JP | 2005-186887 A | 7/2005 |
| JP | 2008-126974 A | 6/2008 |
| JP | 2008-174210 A | 7/2008 |
| JP | 2009-083617 A | 4/2009 |
| JP | 2010-052457 A | 3/2010 |
| JP | 2010-195351 A | 9/2010 |
| JP | 2010-201981 A | 9/2010 |

* cited by examiner

KNEE AIRBAG DEVICE FOR AN AUTOMOBILE

CROSS-REFERENCE TO RELATED APPLICATIONS

This is a national phase application based on the PCT International Patent Application No. PCT/JP2011/073343 filed on Oct. 11, 2011, the entire contents of which are incorporated herein by reference.

TECHNICAL FIELD

The present invention relates to a knee airbag device for an automobile that protects both knee areas of a seated occupant at the time of a collision.

BACKGROUND ART

The below-mentioned Patent Document 1 discloses a knee airbag for a vehicle in a configuration that is provided with a lower inflation portion that protects a knee area forward portion and a shin area of a seat occupant and an upper inflation portion that protects a knee area upward portion of the seated occupant. A thickness of the upper inflation portion is made thinner than the lower inflation portion by a pair of straps. Thus, a gas pressure inside the upper inflation portion is made lower than a gas pressure inside the lower inflation portion.

It is stated that, according to the knee airbag device for a vehicle with the configuration described above, because the upper inflation portion is provided, the knee area upward portion of the seated occupant may be protected, and because the upper inflation portion is thinner and has a lower internal pressure than the lower inflation portion, a load on the lower leg of the seated occupant may be reduced.

Patent Document 1: Japanese Patent Application Laid-Open (JP-A) No. 2004-122922
Patent Document 2: JP-A No. 2003-175793
Patent Document 3: JP-A No. 2005-186887
Patent Document 4: JP-A No. 2008-126974
Patent Document 5: JP-A No. 2009-083617
Patent Document 6: JP-A No. 2010-052457

DISCLOSURE OF INVENTION

Technical Problem

However, although axial forces (compression forces) on the shins of the leg area of a seated occupant may be reduced by setting the internal pressure of the upper inflation portion lower than the internal pressure of the lower inflation portion in a case according to the prior art, it is desirable to reduce the load even further.

Moreover, because the upper inflation portion is formed into a thinner shape than the lower inflation portion by the straps and the internal pressure of the upper inflation portion is lower, performance in protecting the knee areas of large-bodied occupants may be reduced.

In consideration of the circumstances described above, an object of the present invention is to provide a knee airbag device for a vehicle that may suppress or prevent axial forces on the shins of small-bodied occupants and medium-bodied occupants, and that may improve knee area protection performance for large-bodied occupants.

Solution to Problem

A knee airbag device for a vehicle relating to a first aspect includes: a gas generation portion that, at least one of when a frontal collision occurs or when a frontal collision is predicted, operates and generates gas; a knee airbag main body portion that is formed in a thin bag shape and that is inflated and expanded along a lower portion design surface of an instrument panel by gas being supplied from the gas generation portion, a size of the knee airbag main body portion being capable of covering both knee areas of an occupant, from small-bodied occupants to large-bodied occupants; and vertical direction dividing portions that are disposed inside the knee airbag main body portion, join an occupant side base cloth portion with an instrument panel side base cloth portion in a vehicle front-and-rear direction, and extend to a vehicle upward side from portions that correspond with both knee areas of a medium-bodied occupant.

A knee airbag device for a vehicle relating to a second aspect includes: a gas generation portion that, at least one of when a frontal collision occurs or when a frontal collision is predicted, operates and generates gas; a knee airbag main body portion that is formed in a thin bag shape and that is inflated and expanded along a lower portion design surface of an instrument panel by gas being supplied from the gas generation portion, a size of the knee airbag main body portion being capable of covering both knee areas of an occupant, from small-bodied occupants to large-bodied occupants; and vertical direction dividing portions hat are disposed at an upper end portion side of the interior of the knee airbag main body portion, join an occupant side base cloth portion with an instrument panel side base cloth portion in a vehicle front-and-rear direction, are disposed to oppose one another with a spacing in a vehicle width direction, and extend in a vehicle up-and-down direction.

In a knee airbag device for a vehicle relating to a third aspect, in the first aspect or the second aspect, a tether is disposed at the upper portion side of the interior of the knee airbag main body portion, the tether including a left and right pair of the vertical direction dividing portions and a horizontal direction dividing portion that links lower end portions of the pair of vertical direction dividing portions with one another and extends in a vehicle width direction, and the tether being formed in a U shape as viewed from the occupant side thereof.

In a knee airbag device for a vehicle relating to a fourth aspect, in the third aspect, a second tether is disposed at the lower portion side of the interior of the knee airbag main body portion, the second tether being disposed to be parallel with the horizontal direction dividing portion.

In a knee airbag device for a vehicle relating to a fifth aspect, in the third aspect or the fourth aspect, communication holes are formed in the vertical direction dividing portions, the communication holes enabling communication between a region inside the tether and regions at outer sides of the vertical direction dividing portions, and the region inside the tether is specified so as to be at a lower internal pressure than the regions at the outer sides of the vertical direction dividing portions.

According to the first aspect, when a frontal collision occurs or when a frontal collision is predicted, gas is generated from the gas generation portion. The generated gas is supplied into the knee airbag main body portion that is formed in a thin bag shape. Hence, the knee airbag main body portion inflates and expands along the lower portion design surface of the instrument panel. Because the knee airbag main body portion has a size capable of covering both knee areas of an occupant—from small-bodied occupants to large-bodied occupants—both the knee areas of a large-bodied occupant are protected.

Furthermore, the vertical direction dividing portions that join the occupant side base cloth portion with the instrument panel side base cloth portion in the vehicle front-and-rear direction are provided inside the knee airbag main body portion. Because the vertical direction dividing portions extend to the vehicle upward side from the portions that correspond with the two knee areas of a medium-bodied occupant, a region in which the vertical direction dividing portions are provided is resistant to folding. Consequently, when both knee areas of a medium-bodied occupant or a smaller-bodied occupant advance to the knee airbag main body portion due to inertial movement, a region of the knee airbag main body portion that is disposed at the upper side relative to both knee areas is restrained or prevented from tipping down above the knees of the occupant.

According to the second aspect, when a frontal collision occurs or when a frontal collision is predicted, gas is generated from the gas generation portion. The generated gas is supplied into the knee airbag main body portion that is formed in a thin bag shape. Hence, the knee airbag main body portion inflates and expands along the lower portion design surface of the instrument panel. Because the knee airbag main body portion has a size capable of covering both knee areas of an occupant—from small-bodied occupants to large-bodied occupants—both the knee areas of a large-bodied occupant are protected.

Furthermore, the vertical direction dividing portions that join the occupant side base cloth portion with the instrument panel side base cloth portion in the vehicle front-and-rear direction are provided at the upper end portion side of the interior of the knee airbag main body portion. Because these vertical direction dividing portions are disposed to be opposing in the vehicle width direction with a spacing therebetween, and extend in the vehicle up-and-down direction, a region in which the vertical direction dividing portions are provided is resistant to folding. Consequently, when both knee areas of a medium-bodied occupant or a smaller-bodied occupant advance to the knee airbag main body portion due to inertial movement, the upper end portion side of the knee airbag main body portion is restrained or prevented from tipping down above the knees of the occupant.

According to the third aspect, the tether includes the aforementioned pair of left and right vertical direction dividing portions and the lateral direction dividing portion that links the lower end portions of the vertical direction dividing portions to one another, and is formed in a letter U shape as viewed from the occupant side. The tether is disposed at the upper portion side of the interior of the knee airbag main body portion. Consequently, the operational effects of the above-described first aspect and second aspect may be obtained with easy fabrication and a simple structure. A case in accordance with the present aspect provides a benefit in that, because the gas flows upward along both the left and right sides of the interior of the knee airbag main body portion, both knee areas of the occupant may be protected promptly.

According to the fourth aspect, because the second tether is disposed at the lower portion side of the interior of the knee airbag main body portion, the thickness of the airbag in the region in which the second tether is disposed may be regulated. Consequently, when the knee airbag main body portion is inflating and expanding along the lower portion design surface of the instrument panel, strong pressure on the shin area of the occupant by the knee airbag main body portion is restrained.

According to the fifth aspect, the gas flows along both vehicle width direction sides of the second tether and along both sides of the vertical direction dividing portions of the U-shaped tether, and the gas flows through the communication holes into the region inside the tether. At this time, because the region inside the tether is set to a lower internal pressure than the regions at the outer sides of the vertical direction dividing portions, a "leg-opening effect" in which the region inside the tether inflates excessively and the two knees of the seated occupant are forced apart is suppressed.

Advantageous Effects of Invention

As described hereabove, the knee airbag device for a vehicle according to the first aspect and the second aspect provides excellent effects in that axial forces on the shins of small-bodied occupants and medium-bodied occupants may be suppressed or prevented, and in that protective performance of the knee areas of large-bodied occupants may be assured.

The knee airbag device for a vehicle according to the third aspect provides an excellent effect in that axial forces on the shins of small-bodied occupants and medium-bodied occupants may be suppressed or prevented and protective performance of the knee areas of large-bodied occupants may be assured, at low cost.

The knee airbag device for a vehicle according to the fourth aspect provides an excellent effect in that both axial forces acting on the shins of an occupant may be suppressed or prevented and compression forces acting on the shins of an occupant from the vehicle forward side may be suppressed or prevented.

According to the fifth aspect, an excellent effect is provided in that the protective performance of both knee areas of a seated occupant may be further improved by suppressing a leg-opening effect on the two knee areas of the occupant.

BEST MODE FOR CARRYING OUT THE INVENTION

Herebelow, an exemplary embodiment of the knee airbag device for a vehicle according to the present invention is described using FIG. 1 to FIG. 5. An arrow FR that is shown as appropriate in these drawings indicates a vehicle forward side, an arrow UP indicates a vehicle upward side, and an arrow IN indicates a vehicle width direction inner side.

Figure 1:
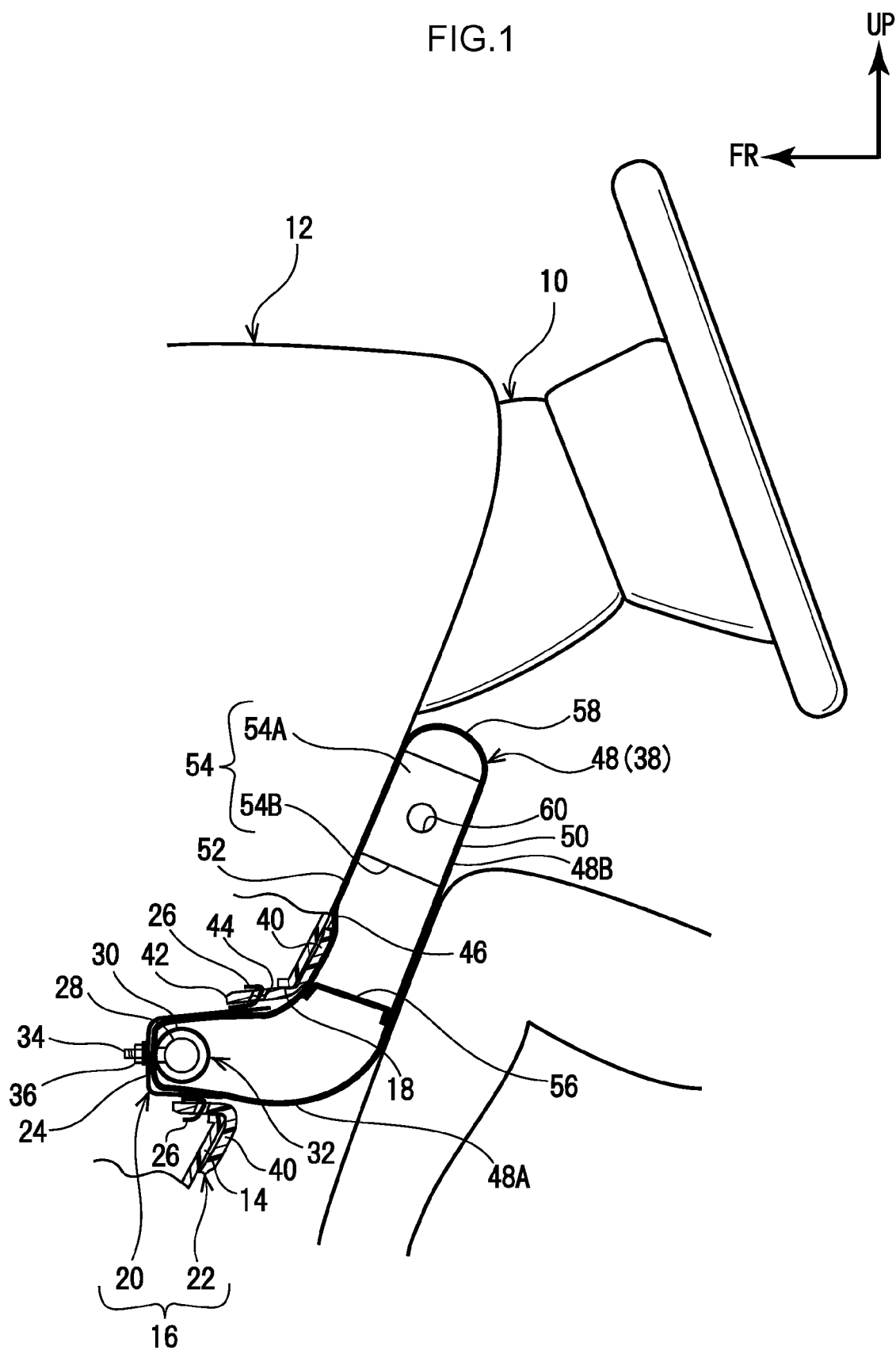
FIG. 1 is a longitudinal sectional diagram showing a state in which a vehicle knee airbag device in accordance with a present exemplary embodiment has operated.

As is shown in FIG. 1, an instrument panel floor 14 that structures a lower portion of an instrument panel 12 is disposed at the lower side of a column cover 10 of a steering column. A vehicle knee airbag device 16 according to the present exemplary embodiment is disposed inside the instrument panel floor 14.

Figure 2:
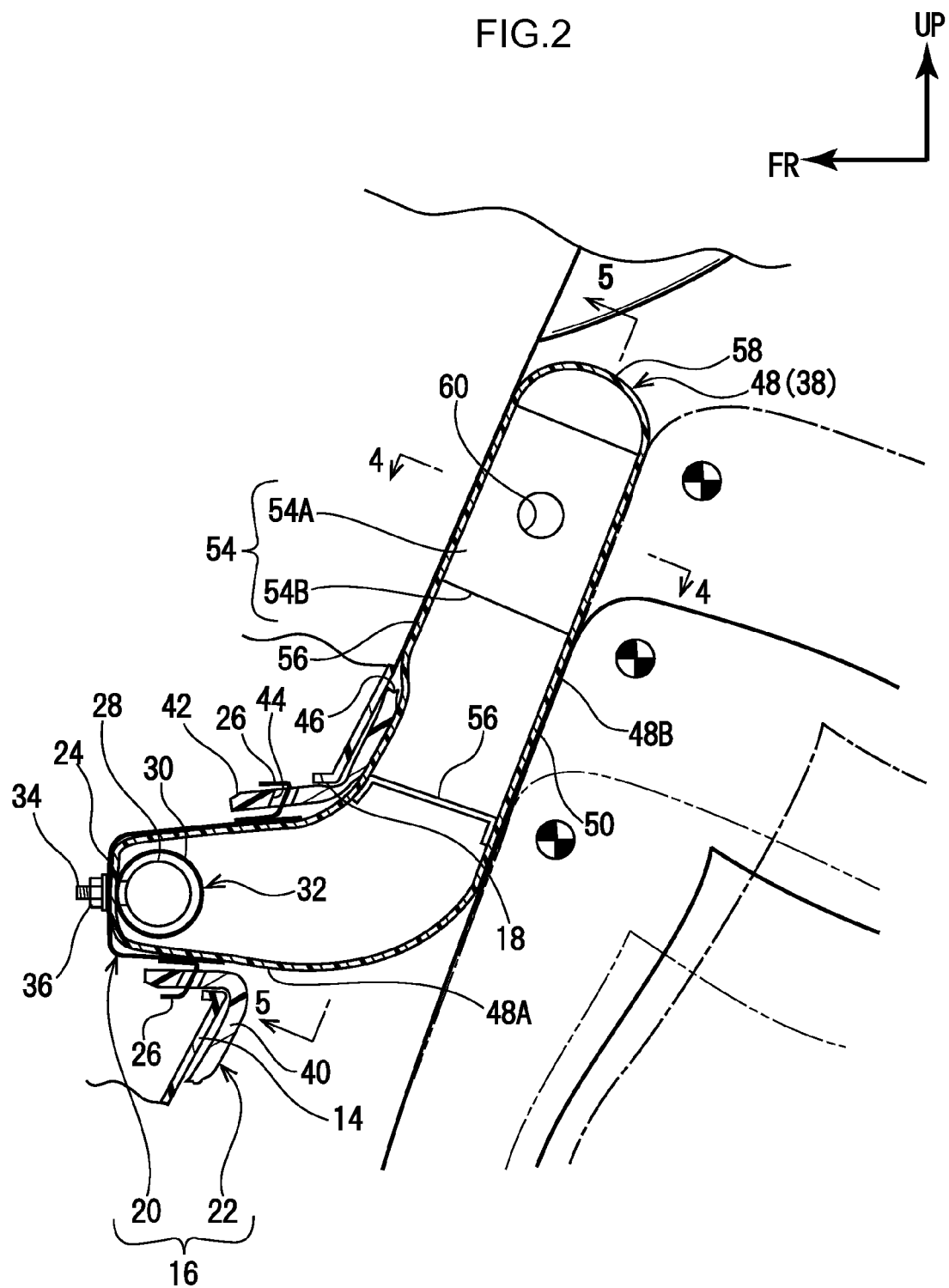
FIG. 2 is a magnified vertical sectional diagram of principal portions, showing relationships between a knee airbag shown in FIG. 1 and the knee area of a seated occupant for respective body types.
Figure 3:
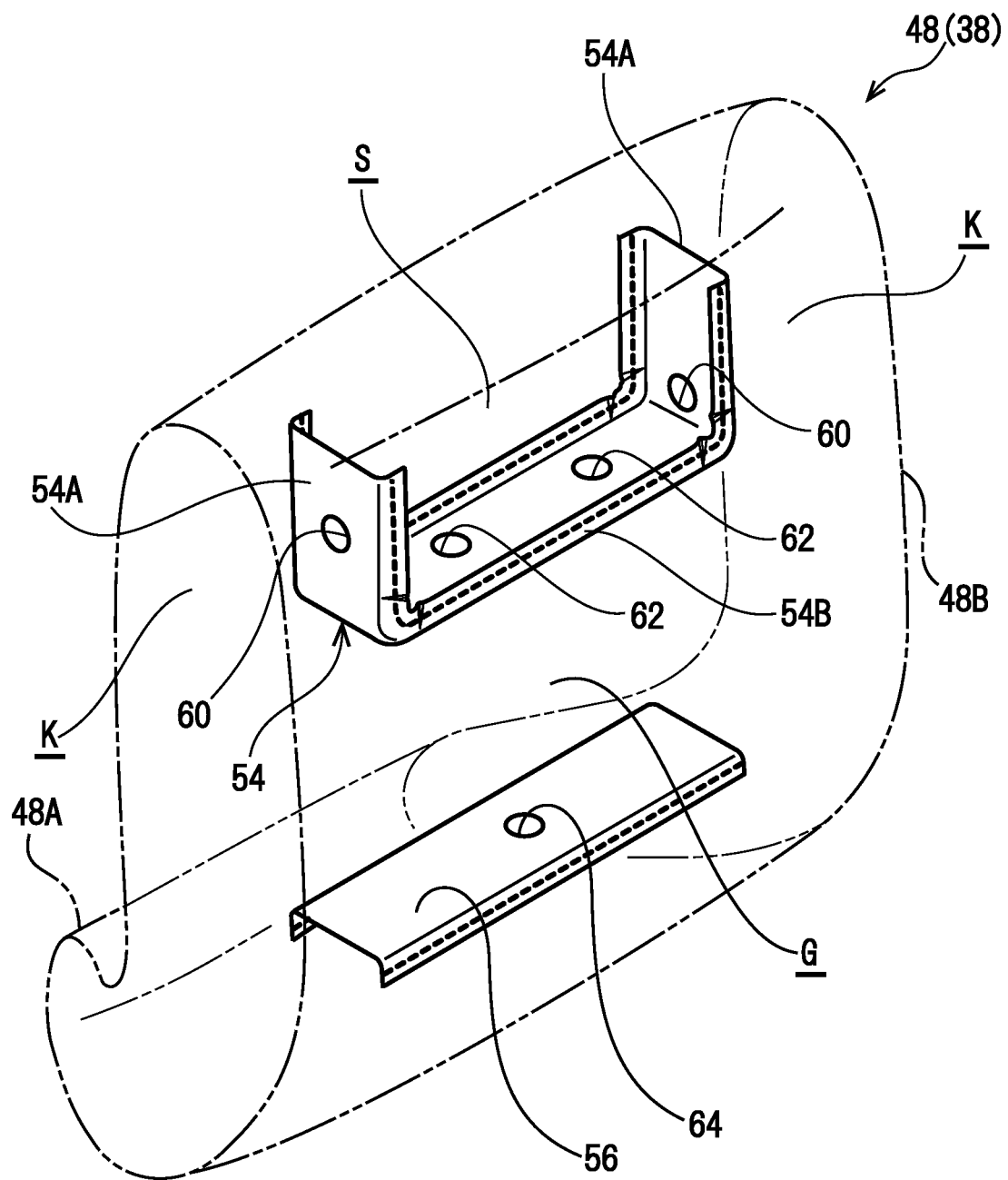
FIG. 3 is a perspective diagram showing the knee airbag shown in FIG. 2 as a single body.
Figure 4:
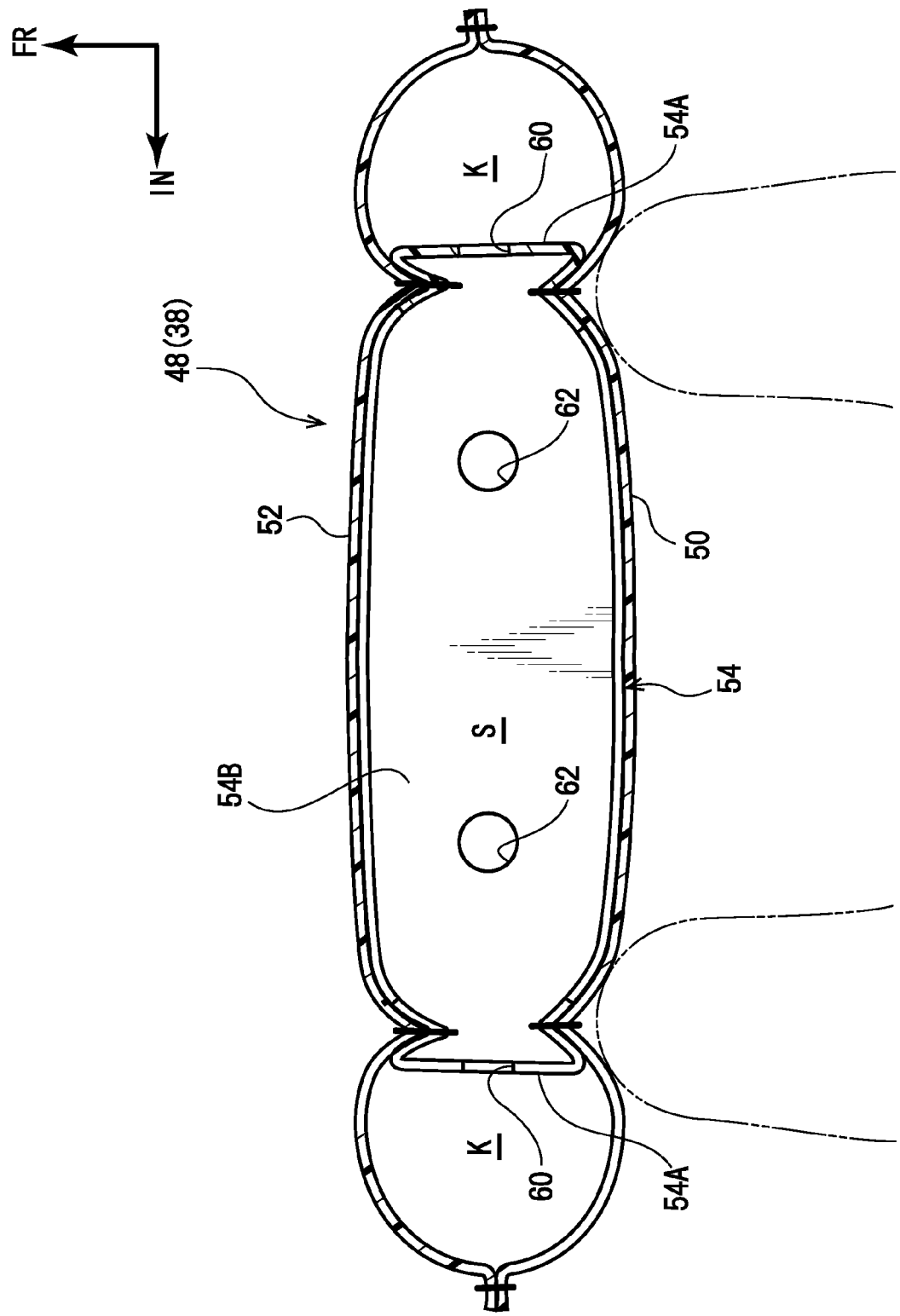
FIG. 4 is a plan sectional diagram showing a state in which the knee airbag shown in FIG. 2 is cut along line 4-4.

As shown in FIG. 2, a substantially rectangular aperture portion 18 is formed at a predetermined position of the instrument panel floor 14 (a position below the column cover 10 of the steering column). Principal portions of the vehicle knee airbag device 16 are structured by an airbag module 20 and an airbag door 22.

The airbag module 20 is provided with a module case 24 fabricated of metal, formed in a substantial box shape. An aperture portion in the module case 24 is disposed so as to be oriented to the rearward of the vehicle. The module case 24 is supported at a vehicle structural member such as the instrument panel or the like by a supporter that is not shown in the drawings. Hook-shaped anchoring portions 26 are formed at the aperture side of upper and lower side wall portions of the module case 24. The anchoring portions 26 are used for mounting of the airbag door 22, which is described below. A gas generation portion 32 is disposed at a floor portion of the module case 24. The gas generation portion 32 is structured by an inflator 28 and a circular tube-shaped diffuser 30. The inflator 28 operates and generates gas when a frontal collision occurs or when a frontal collision is predicted. The diffuser is disposed around the inflator 28.

The inflator 28 is formed in a circular tube shape. A squib (an ignition device), which is not shown in the drawings, is disposed at one axial direction end portion of the inflator 28. The squib ignites an ignition agent when electric current is supplied thereto. A gas jetting-out portion that jets out gas is formed in a protruding state at the other axial direction end portion of the inflator 28. A flow regulation aperture portion, which is not shown in the drawings, is formed at a predetermined position of an outer periphery portion of the diffuser 30 (a portion at the vehicle rearward side of a periphery wall portion). When gas is jetted out from the gas jetting-out portion of the inflator 28, the flow is regulated and the gas is supplied through the flow regulation aperture portion.

A pair of stud bolts 34, which are separated in the axial direction of the inflator 28, are provided standing at the forward end side of the outer periphery portion of the inflator 28. The stud bolts 34 penetrate through the diffuser 30, a knee airbag 38, which is described below, and the floor portion of the module case 24, in this order. Nuts 36 are screwed onto penetrating end portions of the stud bolts 34 from the rear face side of the floor portion of the module case 24. Thus, the gas generation portion 32 and the knee airbag 38 are fixed to the floor portion of the module case 24 in a state in which the gas generation portion 32 and the knee airbag 38 are accommodated inside the module case 24. The gas generation portion 32 is accommodated inside the knee airbag 38 in a state in which the knee airbag 38 is folded up. Therefore, in the state in which the nuts 36 are fastened onto the stud bolts 34, the gas generation portion 32 is fixed in a state in which the knee airbag 38 is retained between the diffuser 30 and the floor portion of the module case 24.

The airbag door 22, which is fabricated of resin, is fitted in at the aperture portion of the above-described module case 24. The airbag door 22 is structured as a separate body from the instrument panel floor 14, and is structured by a pair of upper and lower door portions 40 and leg portions 42. The door portions 40 close off the aperture portion 18 formed in the instrument panel floor 14. The leg portions 42 protrude to the vehicle forward side from rear faces of the door portions 42. Anchoring holes 44, in which the aforementioned anchoring portions 26 of the module case 24 are anchorable, are formed in the leg portions 42. Rupture preparation portions 46, which are formed in an "H" shape as viewed from the occupant side, are provided at rear face sides of the door portions 42. The rupture preparation portions 46 are split open by bag inflation pressure, and the pair of door portions 42 deploy upward and downward. Although the door portions 42 both deploy to open upward and downward, this is not a limitation; the door portions 40 may deploy to open one way, to the vehicle upward side or to the vehicle downward side.

Now, the structure of the knee airbag 38, which is a principal portion of the present exemplary embodiment, is described in detail. As shown in FIG. 2 to FIG. 5, the knee airbag 38 is provided with a knee airbag main body portion 48, which is formed in a thin bag shape by a single base cloth being folded over and outer periphery portions thereof, excluding the fold, being sewn together. The knee airbag 38 does not necessarily have to be fabricated from a single base cloth; the knee airbag may be fabricated by sewing together outer periphery portions of two base cloths. The knee airbag main body portion 48 is provided with a root portion 48A and a protection portion 48B with a substantially cuboid shape. In the inflated and expanded state, the root portion 48A is formed in a tapering shape, a vehicle width direction dimension of which gradually narrows to the case width of the module case 24. The protection portion 48B inflates and expands from below to above along a design surface of the instrument panel floor 14.

As shown in FIG. 2, the protection portion 48B is provided with an occupant side base cloth portion 50 and an instrument panel side base cloth portion 52. The occupant side base cloth portion 50 serves as a surface that catches both knee areas of a seated occupant, and the instrument panel side base cloth portion 52 serves as a surface that pushes against the instrument panel floor 14. The protection portion 48B has a size capable of covering both knee areas of occupants from small-bodied occupants (AF05), illustrated by two-dot chain lines in FIG. 2, to large-bodied occupants (AM95), illustrated by single-dot chain lines. The leg area shown by solid lines is the leg area of a medium-bodied occupant (AM50), which is a standard body type. AF05 refers to a dummy that simulates a small-bodied American female and AM50 represents a dummy that simulates an American male with the standard body type. These dummies are currently used in crash testing in Japan, America and Europe. AM95 refers to the WorldSID dummy, a dummy with portions somewhat larger in build than the AM50. For example, the length below the knee is longer than in the AM50. The AM95 is not currently employed in crash testing in Japan, but may be employed in the future.

Inside the protection portion 48B of the knee airbag main body portion 48 described above, an upper tether 54 and a lower tether 56 are provided at two levels, upper and lower. The upper tether 54 and lower tether 56 are constituted of the same material as the knee airbag main body portion 48. The upper tether 54 is disposed at an upper portion side of the interior of the protection portion 48B. The upper tether 54 is formed in a letter U shape as viewed from the occupant side (in an elevational view), being formed of a pair of left and right vertical direction dividing portions 54A and a horizontal direction dividing portion 54B that links lower end portions of the vertical direction dividing portions 54A together in the vehicle width direction.

The left and right vertical direction dividing portions 54A extend to the vehicle upward side from portions of the protection portion 48B (the portions marked with arrows X in FIG. 5) that correspond with the two knee areas of a medium-bodied occupant (AM50). In other words, the left and right vertical direction dividing portions 54A are disposed to oppose one another with a spacing in the vehicle width direction and extend in the vehicle up-and-down direction. Meanwhile, the horizontal direction dividing portion 54B extends in the vehicle width direction. Upper end portions of the vertical direction dividing portions 54A do not connect with an upper end wall 58 of the protection portion 48B in the present exemplary embodiment, but may connect therewith. The left and right vertical direction dividing portions 54A rise up at right angles with respect to the horizontal direction dividing portion 54B, but may open out at predetermined angles towards the vehicle width direction outer sides of the protection portion 48B.

Figure 5:
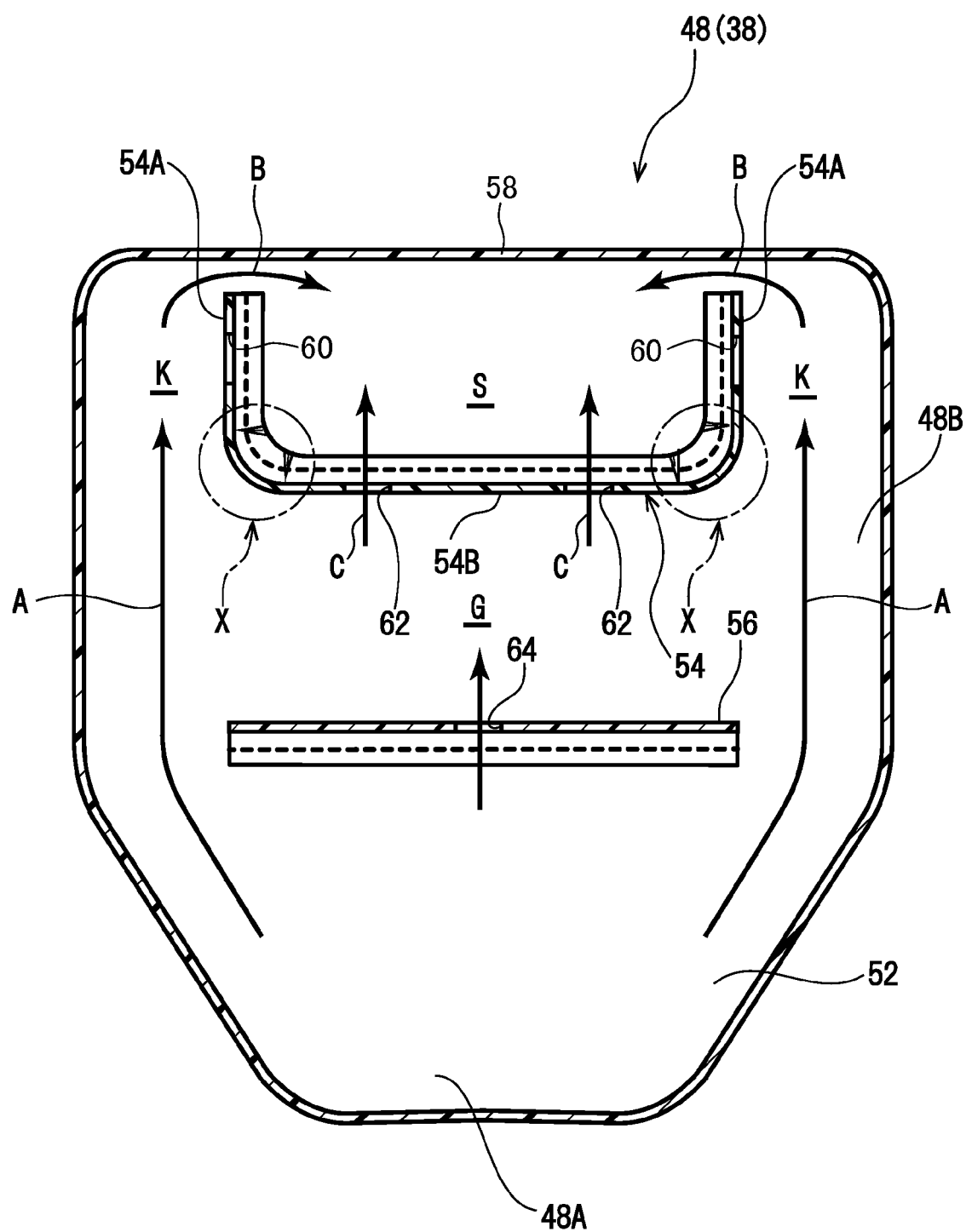
FIG. 5 is a lateral sectional diagram showing a state in which the knee airbag shown in FIG. 2 is cut along line 5-5.

As shown in FIG. 5 and the like, respective communication holes 60 are formed in the vertical direction dividing portions 54A to enable communication between a region S inside the upper tether 54 and regions K at the two outer sides of the vertical direction dividing portions 54A. A pair of communication holes 62 are formed in the horizontal direction dividing portion 54B with a predetermined spacing therebetween in the vehicle width direction. The communication holes 62 communicate between the region S inside the upper tether 54 and a region G between the horizontal direction dividing portion 54B and the lower tether 56. Note that one each of the communication holes 60 and 62 may be provided, and that plural numbers of the same may be provided. In practical terms, the regions S, K and G form a chamber together with the occupant side base cloth portion 50 and instrument panel side base cloth portion 52 of the protection portion 48B. In the state in which gas is supplied, the region S inside the upper tether 54 is set to a lower internal pressure than the regions K at the two outer sides of the vertical direction dividing portions 54A.

The lower tether 56 is disposed at a lower portion side of the interior of the protection portion 48B to be parallel with the horizontal direction dividing portion 54B. The lower tether 56 is set to a location of a portion that corresponds with the shin area of a medium-bodied occupant and of a portion that corresponds with both knee areas of a small-bodied occupant. A communication hole 64 that enables communication between the above and below of the lower tether 56 is formed in a length direction central portion of the lower tether 56.

The upper tether 54 described above corresponds to the "tether" of the present invention, and the lower tether 56 corresponds to the "second tether" of the present invention.

Operation and Effects of the Present Exemplary Embodiment

Now, operation and effects of the present exemplary embodiment are described.

When a frontal collision occurs/when a frontal collision is predicted, an airbag sensor, which is not shown in the drawings, senses that a frontal collision has occurred/a frontal collision is unavoidable and outputs a detection signal to a controller, which is not shown in the drawings. In accordance with the inputted detection signal, a determination is made by the controller as to whether a frontal collision has occurred/a frontal collision is unavoidable. When it is determined that a frontal collision has occurred/it is determined that a frontal collision is unavoidable, a predetermined current is caused to flow to the squib of the inflator 28. As a result, the inflator 28 operates and a large quantity of gas is generated. The flow of the generated gas is regulated by the diffuser 30, after which the gas is supplied to the interior of the knee airbag main body portion 48 of the knee airbag 38 that is in a folded state. A predetermined bag inflation pressure acts on the airbag door 22, and the airbag door 22 splits along the rupture preparation portions 46 and deploys upward and downward. Hence, the protection portion 48B of the knee airbag main body portion 48 inflates and expands from below to above along the design surface of the instrument panel floor 14. Thus, the protection portion 48B of the knee airbag main body portion 48 inflates and expands to between the instrument panel floor 14 and both knee areas of a seated occupant.

As a supplementary description of the flow of the gas, as shown in FIG. 5, the gas is supplied from the gas generation portion 32 to the interior of the root portion 48A of the knee airbag main body portion 48, then is divided between left and right so as to go around the lower tether 56 and ascends, and flows along the outer sides of the left and right vertical direction dividing portions 54A of the upper tether 54 (the gas flow paths at this time are marked with arrows A). Therefore, the two side portions of the protection portion 48B of the knee airbag main body portion 48 inflate and expand first. Thus, even when a gap between both knee areas of the vehicle occupant and the instrument panel floor 14 is small, the protection portion 48B inflates and expands and is interposed between the both knee areas and the instrument panel floor 14 promptly. The gas further passes through the gaps between the upper end portions of the left and right vertical direction dividing portions 54A of the upper tether 54 and the upper end wall 58 of the protection portion 48B and is supplied into the region S inside the upper tether 54 (the gas flow paths here are marked with arrows B). At the same time, the gas passes through the pair of communication holes 62 formed in the horizontal direction dividing portion 54B from the region G between the horizontal direction dividing portion 54B of the upper tether 54 and the lower tether 56 and is supplied into the region S (the gas flow path here is marked with arrows C).

With the vehicle knee airbag device 16 according to the present exemplary embodiment, as shown in FIG. 2, because the protection portion 48B of the knee airbag main body portion 48 has a size capable of covering both knee areas of an occupant, from small-bodied occupants (AF05; see the two-dot chain lines in FIG. 2) to large-bodied occupants (AM95; see the single-dot chain lines in FIG. 2), both knee areas of even a large-bodied occupant are protected.

Furthermore, the vertical direction dividing portions 54A that join the occupant side base cloth portion 50 with the instrument panel side base cloth portion 52 in the vehicle front-and-rear direction are provided inside the knee airbag main body portion 48. The vertical direction dividing portions 54A extend to the vehicle upward side from portions (the portions marked with arrows X in FIG. 5) that correspond with the two knee areas of a medium-bodied occupant (AM50; see the solid lines in FIG. 2), and thus a region in which the vertical direction dividing portions 54A are provided is resistant to bending. Consequently, when both knee areas of a medium-bodied occupant or a smaller-bodied occupant advance to the knee airbag main body portion due to inertial movement, a region of the knee airbag main body portion 48 that is disposed at the upper side relative to both knee areas is restrained or prevented from tipping down above the knees of the occupant.

According to the above descriptions, the vehicle knee airbag device 16 according to the present exemplary embodiment may suppress or prevent axial forces on the shins of small-bodied occupants and medium-bodied occupants, and may assure knee area protection performance even for large-bodied occupants.

Because the present exemplary embodiment has a structure in which the upper tether 54, which includes the pair of left and right vertical direction dividing portions 54A and the horizontal direction dividing portion 54B linking the lower end portions of the vertical direction dividing portions 54A together and is formed in a U shape as viewed from the occupant side, is disposed at the upper portion side of the protection portion 48B of the knee airbag main body portion 48, the operational effects mentioned above may be provided with easy fabrication and a simple structure. Hence, according to the present exemplary embodiment, axial forces on the shins of small-bodied occupants and medium-bodied occupants may be suppressed or prevented and protective performance of the knee areas of large-bodied occupants may be assured, at low cost. When it is specified that the upper tether 54 is formed in the U shape, there is a benefit in that, because the gas flows upward along both the left and right sides of the interior of the knee airbag main body portion 48, both knee areas of the occupant may be protected promptly.

In the present exemplary embodiment, because the linear lower tether 56 is disposed at the lower portion side of the interior of the protection portion 48B of the knee airbag main body portion 48, the thickness of the protection portion 48B of the knee airbag main body portion 48 at the portion at which the lower tether 56 is provided may be regulated. Consequently, when the protection portion 48B of the knee airbag main body portion 48 is inflating and expanding along the design surface of the instrument panel floor 14, strong pressures on the shin area of the occupant from the knee airbag main body portion 48 are restrained. Thus, according to the present exemplary embodiment, both axial forces acting on the shins of an occupant may be suppressed or prevented and compression forces acting on the shins of an occupant from the vehicle forward side may be suppressed or prevented.

In the present exemplary embodiment, the gas flows along the two vehicle width direction sides of the lower tether 56 and the two sides of the vertical direction dividing portions 54A of the U-shaped upper tether 54, and flows through the communication holes 60 formed in the vertical direction dividing portions 54A of the upper tether 54 and through the communication holes 62 formed in the horizontal direction dividing portion 54B into the region S inside the upper tether 54. At this time, the region S inside the upper tether 54 is set to a lower internal pressure than the regions K at the two outer sides of the vertical direction dividing portions 54A. Therefore, a "leg-opening effect" in which region S inside the upper tether 54 inflates excessively and the two knee areas of the seated occupant are forced apart is suppressed. Thus, according to the present exemplary embodiment, the protective performance of both knee areas of an occupant may be further improved.

In the exemplary embodiment described above, the left and right vertical direction dividing portions 54A are provided in accordance with the upper tether 54 that is formed in a U shape as viewed from the occupant side being set in the upper portion side of the interior of the protection portion 48B, but this is not a limitation. The left and right vertical direction dividing portions may be set by, for example, a cushion-shaped bag that is smaller than the protection portion 48B of the knee airbag main body portion 48 being set in the upper portion side of the interior of the protection portion 48B.

Further, in the exemplary embodiment described above, a structure is employed in which both the upper tether 54 and the lower tether 56 are provided at two levels, upper and lower, but this is not a limitation. The upper tether 54 alone may be provided and the lower tether 56 eliminated. Further still, in relation to the present invention, only portions of the upper tether 56 that correspond to the left and right vertical direction dividing portions 56A are necessary; a horizontal direction dividing portion is not a necessity. Other alternative configurations may also be applicable.

The invention claimed is:

1. A knee airbag device for a vehicle, comprising:
   a gas generation portion that, at least one of when a frontal collision occurs or when a frontal collision is predicted, operates and generates gas;
   a knee airbag main body portion that is formed in a thin bag shape and that is inflated and expanded along a lower portion design surface of an instrument panel by gas being supplied from the gas generation portion, a size of the knee airbag main body portion being capable of covering both knee areas of an occupant, from small-bodied occupants to large-bodied occupants; and
   vertical direction dividing portions that are disposed inside the knee airbag main body portion, wherein the vertical direction dividing portions:
      join an occupant side base cloth portion with an instrument panel side base cloth portion in a vehicle front-and-rear direction, and
      extend substantially straight in a vertical direction from positions that correspond with both knee areas of a medium-bodied occupant to an upper end wall of the knee airbag main body portion,
   wherein the gas is supplied from the gas generation portion to the interior of a root portion of the knee airbag main body portion and hence flows along outer sides of left and right the vertical direction dividing portions.

2. The knee airbag device for a vehicle according to claim 1, wherein a tether is disposed at the upper portion side of the interior of the knee airbag main body portion, the tether including a left and right pair of the vertical direction dividing portions and a horizontal direction dividing portion that links lower end portions of the pair of vertical direction dividing portions with one another and extends in a vehicle width direction, and the tether being formed in a U shape as viewed from the occupant side thereof.

3. The knee airbag device for a vehicle according to claim 2, wherein a second tether is disposed at the lower portion side of the interior of the knee airbag main body portion, the second tether being disposed to be parallel with the horizontal direction dividing portion.

4. A knee airbag device for a vehicle, comprising:
   a gas generation portion that, at least one of when a frontal collision occurs or when a frontal collision is predicted, operates and generates gas;
   a knee airbag main body portion that is formed in a thin bag shape and that is inflated and expanded along a lower portion design surface of an instrument panel by gas being supplied from the gas generation portion, a size of the knee airbag main body portion being capable of covering both knee areas of an occupant, from small-bodied occupants to large-bodied occupants; and
   vertical direction dividing portions that are disposed at an upper end portion side of the interior of the knee airbag main body portion, wherein the vertical direction dividing portions:
      join an occupant side base cloth portion with an instrument panel side base cloth portion in a vehicle front-and-rear direction,
      are disposed to oppose one another with a spacing in a vehicle width direction, and
      extend substantially straight in a vehicle up-and-down direction to an upper end wall of the knee airbag main body portion,
      wherein the gas is supplied from the gas generation portion to the interior of a root portion of the knee airbag main body portion and hence flows along outer sides of left and right the vertical direction dividing portions.

5. A knee airbag device for a vehicle, comprising:
   a gas generation portion that, at least one of when a frontal collision occurs or when a frontal collision is predicted, operates and generates gas;

a knee airbag main body portion that is formed in a thin bag shape and that is inflated and expanded along a lower portion design surface of an instrument panel by gas being supplied from the gas generation portion, a size of the knee airbag main body portion being capable of covering both knee areas of an occupant, from small-bodied occupants to large-bodied occupants; and vertical direction dividing portions that are disposed inside the knee airbag main body portion, join an occupant side base cloth portion with an instrument panel side base cloth portion in a vehicle front-and-rear direction, and extend to a vehicle upward side from portions that correspond with both knee areas of a medium-bodied occupant, wherein the gas is supplied from the gas generation portion to the interior of a root portion of the knee airbag main body portion and hence flows along outer sides of left and right the vertical direction dividing portions, wherein a tether is disposed at the upper portion side of the interior of the knee airbag main body portion, the tether including a left and right pair of the vertical direction dividing portions and a horizontal direction dividing portion that links lower end portions of the pair of vertical direction dividing portions with one another and extends in a vehicle width direction, and the tether being formed in a U shape as viewed from the occupant side thereof, and wherein communication holes are formed in the vertical direction dividing portions, the communication holes enabling communication between a region inside the tether and regions at outer sides of the vertical direction dividing portions, and the region inside the tether is specified so as to be at a lower internal pressure than the regions at the outer sides of the vertical direction dividing portions.

* * * * *